United States Patent
Patel et al.

(10) Patent No.: US 12,309,162 B2
(45) Date of Patent: May 20, 2025

(54) SYSTEM AND METHOD FOR DISTRIBUTED MANAGEMENT OF HARDWARE WITH INTERMITTENT CONNECTIVITY

(71) Applicant: Dell Products L.P., Round Rock, TX (US)

(72) Inventors: Dharmesh M. Patel, Round Rock, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 395 days.

(21) Appl. No.: 18/152,231

(22) Filed: Jan. 10, 2023

(65) Prior Publication Data
US 2024/0236109 A1    Jul. 11, 2024

(51) Int. Cl.
*H04L 9/40* (2022.01)
(52) U.S. Cl.
CPC .................... *H04L 63/105* (2013.01)
(58) Field of Classification Search
CPC .................................... H04L 63/104
See application file for complete search history.

(56) References Cited

U.S. PATENT DOCUMENTS

| | | | |
|---|---|---|---|
| 8,024,225 B1 | 9/2011 | Sirota et al. | |
| 8,024,396 B2 * | 9/2011 | Sedukhin | G06F 9/5061 709/224 |
| 8,750,231 B1 | 6/2014 | Martini | |
| 9,531,607 B1 | 12/2016 | Pai et al. | |
| 10,025,653 B2 | 7/2018 | Goldstein et al. | |
| 10,089,676 B1 | 10/2018 | Gupta et al. | |
| 10,860,587 B2 | 12/2020 | Koukoumidis et al. | |
| 11,036,554 B1 | 6/2021 | Prock et al. | |
| 11,132,457 B2 | 9/2021 | Spektor et al. | |
| 11,159,646 B1 | 10/2021 | Singh | |
| 11,269,872 B1 | 3/2022 | Moo et al. | |

(Continued)

FOREIGN PATENT DOCUMENTS

| | | |
|---|---|---|
| CN | 114730269 A | 7/2022 |
| KR | 20110008272 A | 1/2011 |

(Continued)

OTHER PUBLICATIONS

"Monitoring for DPU capacity planning", AWS Glue, Accessed Sep. 6, 2022, Web Page <https://docs.aws.amazon.com/glue/latest/dg/monitor-debug-capacity.html> (7 Pages).

*Primary Examiner* — Ponnoreay Pich
(74) *Attorney, Agent, or Firm* — WOMBLE BOND DICKINSON (US) LLP

(57) ABSTRACT

Methods and systems for managing distributed systems are disclosed. The distributed systems may include any number of data processing systems that may contribute to the functionality of the distributed system. To contribute to the functionality of the distributed system, each of the data processing systems may need to be configured to positively contribute to one or more functions. To manage configuration of data processing system, a distributed control plane may be utilized that vests decision making authority at different levels within a hierarchy. The hierarchy may be flexible and adapt to changes in connectivity between data processing systems.

20 Claims, 10 Drawing Sheets

(56) References Cited

U.S. PATENT DOCUMENTS

| | | | |
|---|---|---|---|
| 11,323,317 B1 | 5/2022 | Levin et al. | |
| 11,501,763 B2 | 11/2022 | Panchamgam et al. | |
| 11,522,976 B1 | 12/2022 | Baker | |
| 11,632,315 B1 | 4/2023 | Sawal et al. | |
| 11,706,289 B1 * | 7/2023 | Patel | H04L 67/51 |
| | | | 709/203 |
| 11,831,706 B1 * | 11/2023 | Patel | H04L 67/10 |
| 11,841,846 B1 | 12/2023 | Kothari et al. | |
| 11,929,891 B1 * | 3/2024 | Patel | H04L 41/5045 |
| 2002/0091814 A1 * | 7/2002 | Arendt | G06F 11/1425 |
| | | | 719/318 |
| 2007/0180490 A1 * | 8/2007 | Renzi | G06F 21/604 |
| | | | 726/1 |
| 2007/0217335 A1 | 9/2007 | Jayaraman et al. | |
| 2008/0208672 A1 | 8/2008 | Van Riel et al. | |
| 2009/0010264 A1 | 1/2009 | Zhang | |
| 2010/0017506 A1 | 1/2010 | Fadell | |
| 2011/0238498 A1 | 9/2011 | Hassan et al. | |
| 2011/0275344 A1 | 11/2011 | Momtahan et al. | |
| 2012/0003923 A1 | 1/2012 | Pazos et al. | |
| 2012/0304191 A1 | 11/2012 | Morgan | |
| 2014/0059227 A1 | 2/2014 | Esserman et al. | |
| 2014/0181285 A1 | 6/2014 | Stevens et al. | |
| 2014/0187199 A1 | 7/2014 | Yan et al. | |
| 2014/0297521 A1 | 10/2014 | Das et al. | |
| 2014/0357289 A1 | 12/2014 | Smith et al. | |
| 2016/0132310 A1 | 5/2016 | Koushik et al. | |
| 2016/0321097 A1 | 11/2016 | Zhu et al. | |
| 2016/0337474 A1 | 11/2016 | Rao | |
| 2017/0006117 A1 | 1/2017 | Kafle et al. | |
| 2017/0063946 A1 | 3/2017 | Quan et al. | |
| 2019/0171438 A1 | 6/2019 | Franchitti | |
| 2019/0173757 A1 | 6/2019 | Hira et al. | |
| 2019/0220315 A1 | 7/2019 | Vallala et al. | |
| 2019/0347181 A1 | 11/2019 | Cranfill et al. | |
| 2019/0384893 A1 | 12/2019 | Suda | |
| 2020/0186619 A1 | 6/2020 | Huber et al. | |
| 2020/0236116 A1 | 7/2020 | Bower et al. | |
| 2020/0363959 A1 | 11/2020 | Kesavan et al. | |
| 2021/0124744 A1 | 4/2021 | Gladwin et al. | |
| 2021/0182940 A1 | 6/2021 | Gupta et al. | |
| 2021/0200486 A1 | 7/2021 | Mizui | |
| 2021/0226951 A1 * | 7/2021 | Goldstein | H04L 63/20 |
| 2021/0360074 A1 | 11/2021 | Long | |
| 2021/0360083 A1 | 11/2021 | Duggal et al. | |
| 2021/0397308 A1 | 12/2021 | Rahman et al. | |
| 2022/0121623 A1 | 4/2022 | Lyske | |
| 2022/0124009 A1 | 4/2022 | Metsch et al. | |
| 2022/0164838 A1 | 5/2022 | Wang | |
| 2022/0237232 A1 | 7/2022 | Quamar et al. | |
| 2022/0261406 A1 | 8/2022 | Bhuiyan et al. | |
| 2022/0318423 A1 | 10/2022 | Shu et al. | |
| 2023/0072837 A1 | 3/2023 | Brown et al. | |
| 2023/0111811 A1 | 4/2023 | Tran | |
| 2023/0128497 A1 | 4/2023 | Vijayan et al. | |
| 2023/0169080 A1 | 6/2023 | Iyer et al. | |
| 2023/0206329 A1 | 6/2023 | Cella et al. | |
| 2023/0237059 A1 | 7/2023 | Zweig et al. | |
| 2023/0297540 A1 | 9/2023 | Khan et al. | |
| 2023/0402766 A1 | 12/2023 | Garyantes et al. | |
| 2023/0409584 A1 | 12/2023 | Venkatesan et al. | |
| 2024/0231921 A1 * | 7/2024 | Patel | G06F 9/5027 |
| 2024/0232040 A1 * | 7/2024 | Patel | H04L 67/51 |
| 2024/0236109 A1 * | 7/2024 | Patel | H04L 63/105 |

FOREIGN PATENT DOCUMENTS

| | | |
|---|---|---|
| KR | 20130015327 A | 2/2013 |
| WO | 2012173604 A2 | 12/2012 |

\* cited by examiner

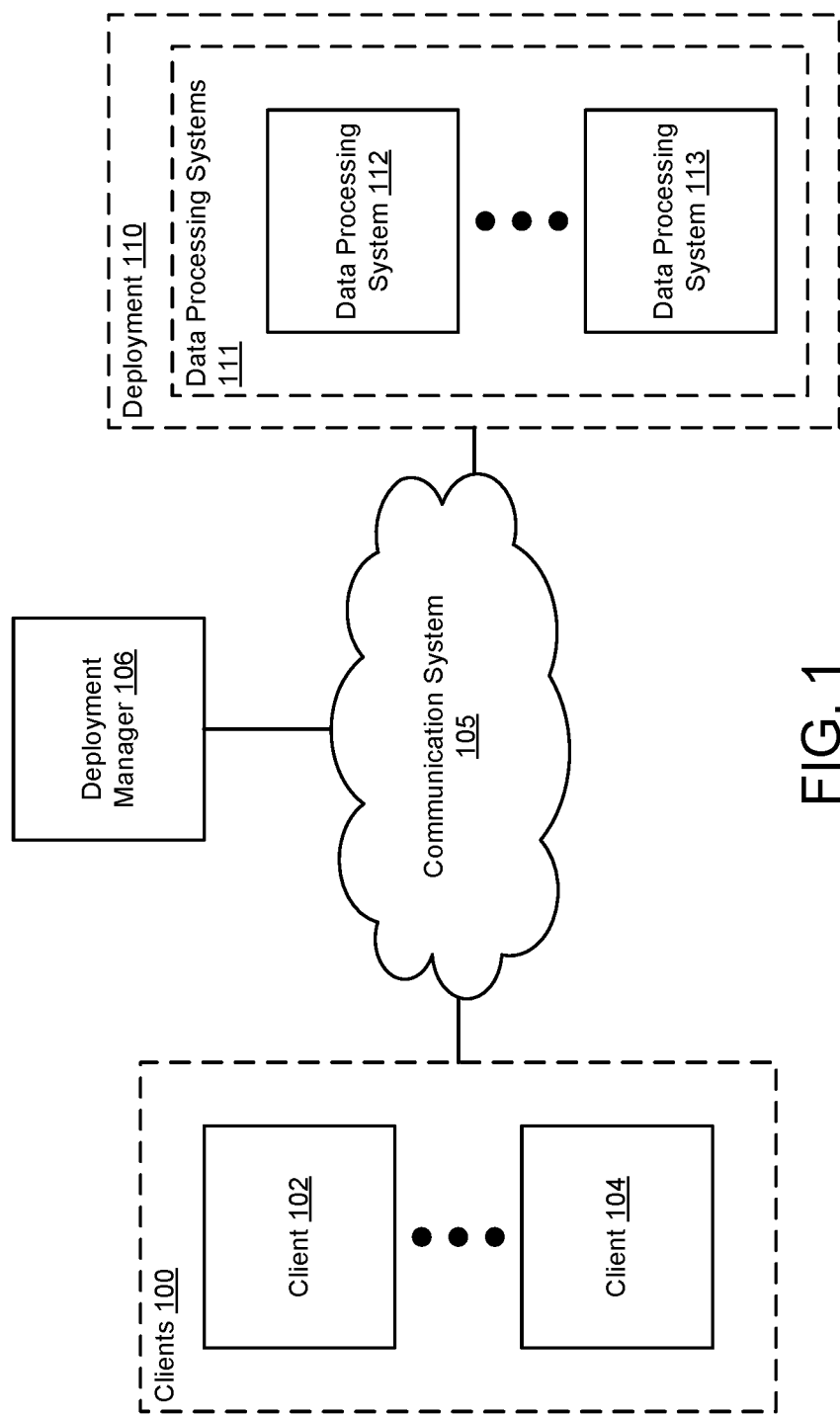

SYSTEM AND METHOD FOR DISTRIBUTED MANAGEMENT OF HARDWARE WITH INTERMITTENT CONNECTIVITY

FIELD OF THE DISCLOSED EMBODIMENTS

Embodiments disclosed herein relate generally to distributed management. More particularly, embodiments disclosed herein relate to systems and methods for distributed control plane management of distributed systems.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
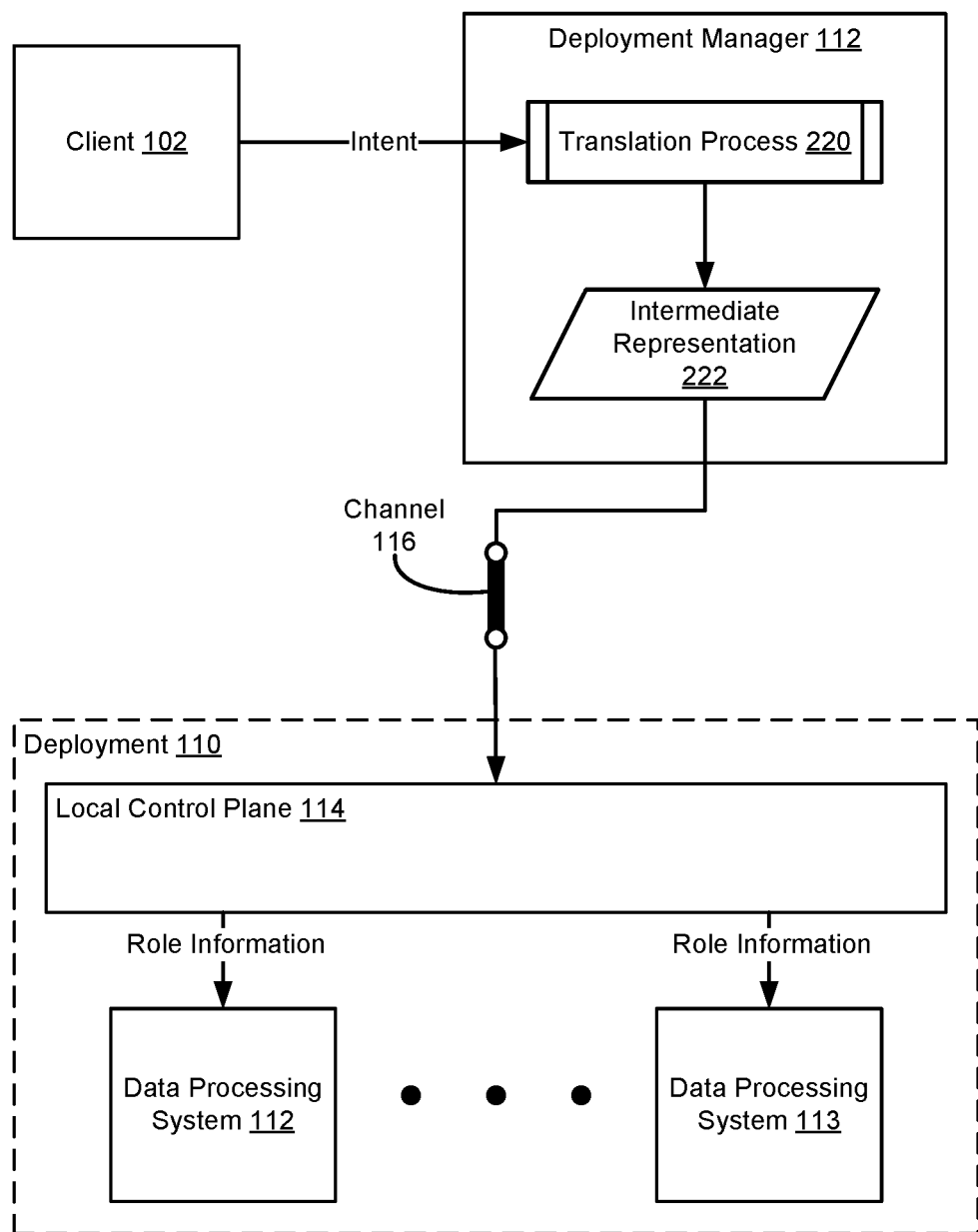
FIGS. 2A-2F show data flow diagrams illustrating data used and processing performed by a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a distributed system. The distributed system may include any number of data processing systems that may contribute to the functionality of the distributed system. To contribute to the functionality of the distributed system, each of the data processing systems may need to be configured in a manner that allows the data processing systems to contribute to providing one or more functionalities.

To manage configuration of the data processing system, a distributed control plane may be utilized. The distributed control plane may vest decision making authority at different levels of a hierarchy used to manage the data processing systems.

The distributed control plane may allow management entities to receive information regarding the intents of users that may desire to receive services from the data processing systems, and decide on roles to be implemented to meet the intents of the users. The roles may be defined by an intermediate representation that does not rigidly express how each of the data processing systems is to be configured, the software to be hosted by the data processing systems, etc. Rather, the roles may define metrics usable to evaluate the capability of a data processing system with a particular configuration to take on a role.

The intermediate representation may allow groups of data processing systems (e.g., a deployment) to establish their respective configurations for providing services requested by a user.

From time to time, portions of the data processing systems may become isolated. While isolated, the data processing systems may establish a local control plane. The local control plane may take into account the connectivity status of the data processing systems, and selectively implement roles tailored for different level of connectivity. Once connectivity is restored, the local control plane may provide information regarding the role assignments to other portions of the control plane. The other portions of the control plane may ratify the assignments or initiate a new role assignment process.

By doing so, embodiments disclosed herein may improve the reliability of services provided by data processing systems. For example, in the context of distributed systems, communication interruptions may limit coordination between data processing systems. By providing flexibility in both role implementation and management role implementation, isolated portions of deployments may be more likely to successfully effectuate a user's intent. Thus, embodiments disclosed herein may address the technical challenging of coordination in distributed systems.

In an embodiment, a computer-implemented method for managing services provided using data processing systems is provided. The method may include obtaining, by a local control plane of a deployment, an intermediate representation of roles to facilitate a desired use of the data processing systems; making, by the local control plane, a determination that the local control plane is communicatively disconnected from other control plane elements; based on the determination: selecting, by the local control plane and using the intermediate representation, a data processing system of the data processing systems as a leader; obtaining, by the leader, self-reported role fit data from the data processing systems for each of the roles, the role fit data indicating estimates of an ability of each of the data processing systems to fulfill each of the roles; establishing, by the leader and based on the role fit data, a temporary deployment plan for services to be provided by each of the data processing systems, the temporary deployment plan indicating assignment for the data processing systems to perform the roles; instantiating, based on the temporary deployment plan, temporary subscriptions for the data processing systems to implement the roles to facilitate the desired use to obtain subscribed data processing systems; and providing the desired use of the data processing systems to a client using the subscribed data processing systems.

The computer-implemented method may also include negotiating, by the leader and using the temporary deployment plan, agreements with the data processing systems to implement at least one of the roles. The subscriptions may also be instantiated based on the agreements.

Negotiating the agreements may include, for a role of the roles: selecting a data processing system of the data processing systems to perform the role; distributing proposals to all of the data processing systems indicating the selected data processing system for the role; obtaining responses from all of the data processing systems based on the distributed proposals; in a first instance of the responses that indicate unanimous assent, recording the data processing system as performing the role in the temporary deployment plan; and in a second instance of the responses that does not indicate unanimous assent, selecting a different data processing system of the data processing systems to perform the role.

The computer-implemented method may also include, after providing the desired use of the data processing systems to the client using the subscribed data processing systems: making, by the local control plane, a second determination that the local control plane is communicatively connected to other control plane elements; performing, by the leader, a validation of the temporary deployment plan with the other control plane elements; in a first instance of the validation where the temporary deployment plan is accepted by the other control plane elements: finalizing the temporary deployment plan; and in a second instance of the validation where the temporary deployment plan is not accepted by the other control plane elements: establishing a replacement deployment plan for the temporary deployment plan.

Finalizing the temporary deployment plan may include initiating performance of tasks by the data processing systems assigned to perform the roles in the temporary deployment plan; evaluating the performance of the tasks to obtain metrics; comparing the metrics to standards associated with the roles to identify a level of compliance for each of the roles; and establishing a performance history for the desired use using the level of compliance for each of the roles.

Providing the desired use of the data processing systems to the client using the subscribed data processing systems may include, based on the performance history, identifying a duration of time for which the use of the data processing systems is provided to the client.

The duration of time may include a first time period while the local control plane is communicatively disconnected from the other control plane elements and a second time period while the local control plane is communicatively connected to the other control plane elements.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to, one or more clients 100, deployment 110, and a communication system 105 that facilitates operable connections between all, or a portion, of the components illustrated in FIG. 1. Each of these components is discussed below.

All, or a portion, of clients 102-104 may provide services to users of clients 100 and/or to other devices operably connected to clients 100. To provide services (e.g., computer implemented services) to users or other devices, clients 100 may utilize services provided by deployment 110. Deployment 110 may provide any type and quantity of computer implemented services. The computer implemented services provided by deployment 110 may be specified by clients 100 and/or other entities.

To provide the computer implemented services to clients 100, deployment 110 may include any number of data processing systems 112-113. The data processing systems may each provide respective computer implemented services. The data processing systems may provide similar and/or different computer implemented services. All, or a portion, of the computer implemented services may be provided cooperatively by multiple data processing systems while other computer implemented services may be provided independently by various data processing systems.

In aggregate, the computer implemented services provided by deployment 110 may provide one or more overall solutions (e.g., a solution architecture, a solution service, etc.). An overall solution may be provided when deployment 110 provides one or more predetermined services.

For example, consider a scenario where deployment 110 provides tiered data storage services to clients 100. To provide the tiered data storage services, data processing systems 112-113 may need to (i) intake data, (ii) select a storage location for data, (iii) preprocess the data prior to storage (e.g., deduplication), (iv) store the data in the storage location, and (v) migrate the data between storage locations so as to properly tier the data as its relevance/importance changes over time. To provide functionalities (i)-(v), various data processing systems of deployment 110 may need to be appropriately configured (e.g., specific hardware settings, software settings, firmware, operating systems, service applications, etc.) with some data processing systems being configured differently.

However, depending on the capabilities of data processing systems 112-113, any of the data processing systems may not be able to be configured in accordance with a static or rigid specification. For example, any of the data processing systems may lack hardware or functionalities to provide certain services as part of a solution architecture, any of the hardware may already be in use for other types of services and may not be reconfigurable (e.g., without impacting the already-provided services), any of the data processing systems may lack certain software or may host software that may conflict with software specified for a static configuration, etc.

Further, to provide aggregate functionality, data processing systems 112-113 may need to perform various functions that complement one another. If one of these functionalities is not provided, then the aggregate functionality may be impaired (e.g., provided at a lesser level of quality than desired, not provided at all, etc.).

Additionally, deployment 112 may be implemented as an edge system where resources (e.g., power, computing capability, etc.) and connectivity (e.g., between data processing systems 111, deployment manager 106, and clients 100) is limited and/or intermittent. Accordingly, the capabilities of the system of FIG. 1 may change dynamically over time.

In general, embodiments disclosed herein relate to systems, methods, and devices for managing the configurations of data processing systems of a deployment to provide services desired by user of clients. The configurations of the data processing systems may be managed using an intermediate representation of roles that, when fulfilled, are likely to successfully effectuate an intent of a user that requests that a solution service or architecture (and/or other expression of intent) be provided.

Rather than specifying static or rigid configurations, the intermediate representation of the roles may be used to evaluate whether a data processing system may be configured in various manners to perform any of the roles. The intermediate representation of the roles may be used by a distributed control plane to identify and configure data processing systems to effectuate the intent of the user.

The representation of the roles may be used, for example, to identify performance metrics (or other types of information) usable to grade and/or otherwise rank the abilities of data processing systems to perform the roles. The grades, ranking, and/or other types of quantifications of ability to perform roles may be used to provisionally select which of the data processing systems to perform various roles.

The provisional selection may then be used to propose roles that each of the data processing systems may perform. The proposals may serve as a basis for negotiation regarding which data processing systems will perform the roles.

The negotiation process may, if impasses are reached, include modifying goals and expectations associated with services to be provided to the requestors. For example, if none of the data processing systems that have been provisionally selected to perform the role agree to take on the role, then the data processing systems that have reported the ability to perform a role as a member of a may be considered for the role. If agreements can be reached, then some data processing systems may be forced to accept the proposals.

Once agreements have been reached, the data processing systems may be configured to perform the roles through a subscription-based system. Once confirmed, the configured data processing systems may provide computer implemented services that are likely to meet an intent of a requestor. Refer to FIGS. 2A-2F for additional details regarding management of data processing systems to provide desired computer implemented services.

By virtue of the distributed nature of the control plane used to manage the configurations of data processing systems 111, various portions of the distributed control plane may be isolated, disconnected, and/or otherwise unable to communicate with other portions of the distributed control plane. For example, deployment manager 106 and the portion of the distributed control plane hosted by it may be unable to communicate with the portions of the distributed control plane hosted by deployment 110 if connectivity between deployment 110 and communication system 105 is limited. Such scenarios may occur, for example, in edge and/or other types of computing environments that may have more limited connectivity to core communication systems such as communication system 105.

When unable to communicate with other portions of the distributed control plane, the isolated portions of the control plane may (i) operate independently until communication is restored, (ii) use information included in the intermediate representations to establish a temporary set of rules and procedures for operation while isolated, and (iii) while out of communication, may treat all decisions as being temporary until ratified or otherwise validated by the other portions of the control plane upon restoration of communications. To establish a temporary set of rules and procedure, the intermediate representation may, in addition to defining roles for providing services, define roles for managing independent operation of the isolated portion of the control plane.

For example, the intermediate representation may define a set of roles to be performed by data processing systems of a deployment while isolated from the rest of the control plane. The roles may include, for example, (i) a leader tasked with selecting roles for data processing systems, (ii) a validator tasked with independently validating that the data processing systems that take on roles perform them in accordance with metrics that define successful performance of the roles, and (iii) a reporter tasked with independently recording information regarding the performed roles while the deployment is isolated and providing information regarding the performance of the roles once communication with the remainder of the control plane is reestablished.

By doing so, embodiments disclosed herein may provide a system that is more likely to meet the intents of requestors while providing flexibility in deployment and management. By avoiding use of rigid configurations for roles and top-down management, the system may facilitate distributed management of data processing systems even while portions of the data processing systems are out of communication with portions of control planes. Accordingly, embodiments disclosed herein may provide an improved computing system that is able to provide desired services under a broader array of operating conditions that may intermittently impair functionality of the system such as communication functionality.

To provide the above-noted functionality, the system of FIG. 1 may include deployment manager 106. Deployment manager 106 may (i) obtain information (e.g., intents) regarding services to be provided to clients 100, (ii) generate intermediate representations based on the obtained information, (iii) distribute the intermediate representations to deployment 110 for implementation, (iv) store information (e.g., subscriptions) regarding some of the data processing systems of deployment 110 used to implement the services for clients 100, and/or (v) manage the portion of the data processing systems used to provide the services to ensure that the services are provided in a manner that meet the expectations of the users of clients 100. When doing so, deployment manager 106 may operate as a member of distributed control plane that extends down to data processing systems 111.

The distributed control plane may vest decision making authority, at least in part, at different levels within the distributed control plane and modify that decision making authority responsive to changes in operable connectivity between the different levels of the distributed control plane. For example, deployment manager 106 may have authority to define an intermediate representation that data processing systems (e.g., 112-113) will implement. Other portions of the distributed control plane may have authority to decide on which roles different data processing systems will take on to provide the services on which the intermediate representation was based. Further, when isolated the other portions of the distributed control plane may automatically take on new roles to continue successful operation of the system.

For example, upon (and/or preceding) isolation, data processing systems of a deployment may automatically assign management roles and initiate independent operation. During independent operation, the data processing systems may operate based on a temporary control plane that requires a higher level of agreement or consensus. The higher degree of agreement or consensus may improve the likelihood of a successful set of configurations for data processing systems being implemented albeit at potentially lower levels of performance and/or resource efficiency.

By implementing the distributed control plane in this manner, multiple instances of deployment manager 106 may independently manage provisioning of services without needing to maintain a map (or other types of representations) of the activities of the data processing systems of any number of deployments. For example, any number of instances of deployment manager 106 may independently process service requests from clients 100 without needing to coordinate with other instances of deployment manager 106 (at least for resource management purposes). By doing so, the distributed control plane may be able to manage services for larger numbers of clients using larger numbers of data processing systems (and/or virtualized/containerized/non-physical replicas of data processing systems).

Deployment 110 may include any number of data processing systems 111 and/or other components. Deployment 110 may be implemented, for example, as a portion of a data center, public or private cloud, edge system, and/or other type of computing environment. Deployment 110 may be geographically separated from deployment manager 106 and/or clients 100.

Generally, deployment 110 may implement a portion of the distributed control plane. The portion of the distributed control plane implemented by deployment 110 may be responsible for providing services by implementing intermediate representations provided by deployment manager 106 and/or other members of other portions of the distributed control plane. To do so, the portion of the distributed control plane implemented by deployment 110 may (i) obtain information based on the intermediate representation, (ii) identify members of deployment 110 that may take on roles based on the information, (iii) cooperatively decide which member of deployment 110 will take on each of the roles (and/or which group of members may take on roles in scenarios in which a role may require multiple data processing systems), (iv) configure the data processing systems based on the data processing systems elected to perform the roles through a subscription system, and (v) after configuration, initiate performance of computer implemented services.

However, when isolated from the remainder of the control plane, the portion of the distributed control plane may change its operation such that it may operate independently from the remainder of the control plane. To do so, roles defined by the intermediate representation may be implemented, and the data processing systems performing the roles may then operate the isolated deployment (e.g., through configuration of data processing systems). While operating independently, the role decisions made and implemented may be treated as temporary subject to ratification or acceptance by the rest of the control plane once communications are restored. While operating independently, the isolated portion of the control plane may typically make more conservative decisions to improve the likelihood of services being provided successfully. However, this approach may result in inefficient use of resources. Consequently, even if services are successfully provided while isolated, once reconnected to the remainder of the control plane the role assignments may be modified using a more aggressive set of decision make rules thereby improving the resource efficiency of providing services. Refer to FIGS. 2B-2F for additional details regarding deployment 110.

While performing their functionalities, any of clients 100, deployment manager 106, and deployment 110 may perform all, or a portion, of the method illustrated in FIG. 3.

Any of clients 100, deployment manager, and deployment 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding computing devices, refer to FIG. 4.

Communication system 105 may include one or more networks that facilitate communication between all, or a portion, of clients 100, deployment manager 106, and deployment 110. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployment 110 may be operably connected to one another via a second local network which is also operably connected to the Internet thereby allowing any of clients 100 and deployment 110 to communication with one another and/or other devices operably connected to the Internet. Clients 100, deployment 110, deployment manager 106, and/or communication system 105 may be adapted to perform one or more protocols for communicating via communication system 105.

While illustrated in FIG. 1 as including a limited number of specific components, a system in accordance with an embodiment may include fewer, additional, and/or different components than those illustrated therein.

As discussed above, the system of FIG. 1 may implement a control plane that manages resource data processing systems to provide computer implemented services. FIGS. 2A-2F show data flow diagrams in accordance with an embodiment disclosed herein. The data flow diagrams may show operation of an example system over time. For example, FIGS. 2A-2F may show flows of data and processes performed that may facilitate use of functionalities provided by deployments.

Turning to FIG. 2A, a first data flow diagram in accordance with an embodiment is shown. To initiate use of a computer implemented service, client 102 may convey an intent to deployment manager 106. The intent may be conveyed by providing information indicating one or more functionalities that the user of client 102 desires to utilize. The intent may be conveyed by, for example, presentation of one or more graphical user interfaces to the user of client 102. The graphical user interfaces may indicate the functionalities that may be provided by deployment 110. The user may select the functionalities to be provided via the graphical user interfaces, thereby conveying an intent to deployment manager 106 regarding desired functionalities.

In addition to functionalities, various limits and/or other criteria for the functionalities (e.g., referred to as "service limits") may be provided by the user. The limits may specify, for example, financial limits regarding cost for the services, the extent of the provided functionalities such as numbers of devices to which the functionalities are to be provided or rates at which the functionalities are to be provided, and/or other types of limits.

Implementing any of the functionalities may require, for example, configuration of one or more hardware components of a data processing system and deployment and/or configuration of one or more software components (e.g., a "software stack") to the data processing system for the data processing system to be able to provide, at least in part, the respective functionalities. However, the functionalities may not require specific hardware components and configurations thereof, or a specific software stack. Rather, the functionalities may be considered as being provided effectively by various hardware and software stacks, so long as various performance metrics may be met.

For example, if the functionality is to store and provide stored data, various types of storage devices and software layers for managing the stored data may all be capable of meeting the functionality of storing data and providing stored data at a particular rate. Rather than attempting to rigidly define hardware and software stacks that must be implemented to meet the intent of the user (e.g., storing and reading data at predetermined rates), an intermediate representation 222 based on the intent may be obtained.

Intermediate representation 222 may be obtained via translation process 220. Translation process 220 may take the intent from the user of client 102 and/or other types of information such as the service limits, and obtain one or more roles that, when provided, are likely to meet the intent of client 102. Intermediate representation may indicate the roles that are to be implemented based on the user's expressed intent.

The roles may be established via a lookup in a database or other process. For example, the database may include associations between functionalities, service limits, and roles. When a functionality and/or service limit is identified based on a user's expressed intent, one or more roles may be identified by performing the lookup in the database. As will be discussed in greater detail below, each of the roles may be associated with performance metrics usable to identify and/or rank data processing systems (e.g., 112-113) of deployment 110 with respect to their abilities to perform the roles.

In addition to roles for meeting the user's expressed intent, additional roles may be added to the intermediate representation. These additional roles (e.g., also referred to as "management roles") may be used to manage control of a deployment when the deployment is disconnected from deployment manager 112. The management roles added to intermediate representation 222 may include any number of roles. The management roles may be associated with the expressed user intent (e.g., much like the roles used to effectuate the user's intent, and identifiable through a lookup process).

Because different deployments may include different numbers and types of data processing systems, multiple sets of management roles and/or a set of scaling rules may be included in intermediate representation 222. If multiple sets of managements roles are included in intermediate representation 222, then each of the sets may be associated with criteria based on a deployment implementing the roles. The criteria may relate, for example, to the numbers and capabilities of data processing systems of the deployment. The criteria may indicate that sets of roles with larger numbers of management roles are to be implemented for deployments that include larger numbers of data processing systems and that sets of roles with smaller numbers of management roles are to be implemented for deployment that include smaller numbers of data processing systems. If scaling rules are included in intermediate representation 222, then the number of instances of each of the roles may be scaled based on the scaling rules. For example, the scaling rules may specify scaling factors that are based on the numbers and capabilities of data processing systems of a deployment implementing intermediate representation 222.

The scaling rules may also specify, for example, different systems of governance to be implemented by the management roles depending on the level of scaling. For example, as the level of scaling increases passed a threshold, the level of decision making authority vested in each data processing system may decrease. While below the threshold, the governance system may require unanimous consent of all data processing systems managed by a control plane for a decision by the control plane (e.g., by a leader thereof) to be implemented. In contrast, once above the threshold, the governance system may only require a majority (e.g., or a specific ratio) of the data processing systems managed by a control plane for a decision by the control plane (e.g., by a leader thereof) to be implemented.

Each of the management roles may be associated with a set of criteria through which data processing systems are selected for the roles. The criteria may include: (i) a minimum level of operable connectivity to other data processing systems, (ii) a quantity of available computing resources for implementing the management role, (iii) an assurance level regarding the likelihood of continued operation (e.g., such as a requirement for having a battery backup system and/or other power sources available in the event of a failure of a primary power source) of the data processing system, and/or (iv) other types of limiting criteria.

Once obtained, intermediate representation 222 may be provided to local control plane 114 of deployment 110. Local control plane 114 may be a service that manages configuration of data processing systems 112-113 to provide services. Local control plane 114 may be hosted by another device (not shown) and/or may be implemented using distributed services (e.g., hosted, in part, by each of the data processing systems).

Local control plane 114 may distribute role information for the roles defined by intermediate representation 222 to the data processing systems. The role information may include, for example, numbers and types of roles to be implemented by deployment 110, including management roles.

In a scenario in which deployment 110 is an edge deployment or other type of computing system remote to deployment manager 112, the data processing systems of deployment 110 may be operably connected to deployment manager 112 via channel 112. Channel 112 may only provide intermittent connectivity. The intermittent connectivity may, from time to time, cause deployment 110 to be communicatively isolated.

For example, channel 116 may be implemented, at least in part, with a wireless or wired communication system that be unable to carry communications from time to time (e.g., in a wireless system, environmental conditions such as weather systems may prevent data transmission during the weather; in a wired system, repeater time outs or other hardware failures may prevent data transmission until replaced). When isolated, the data processing systems of the deployment may automatically implement management roles to establish a temporary framework for independent operation.

Figure 2B:
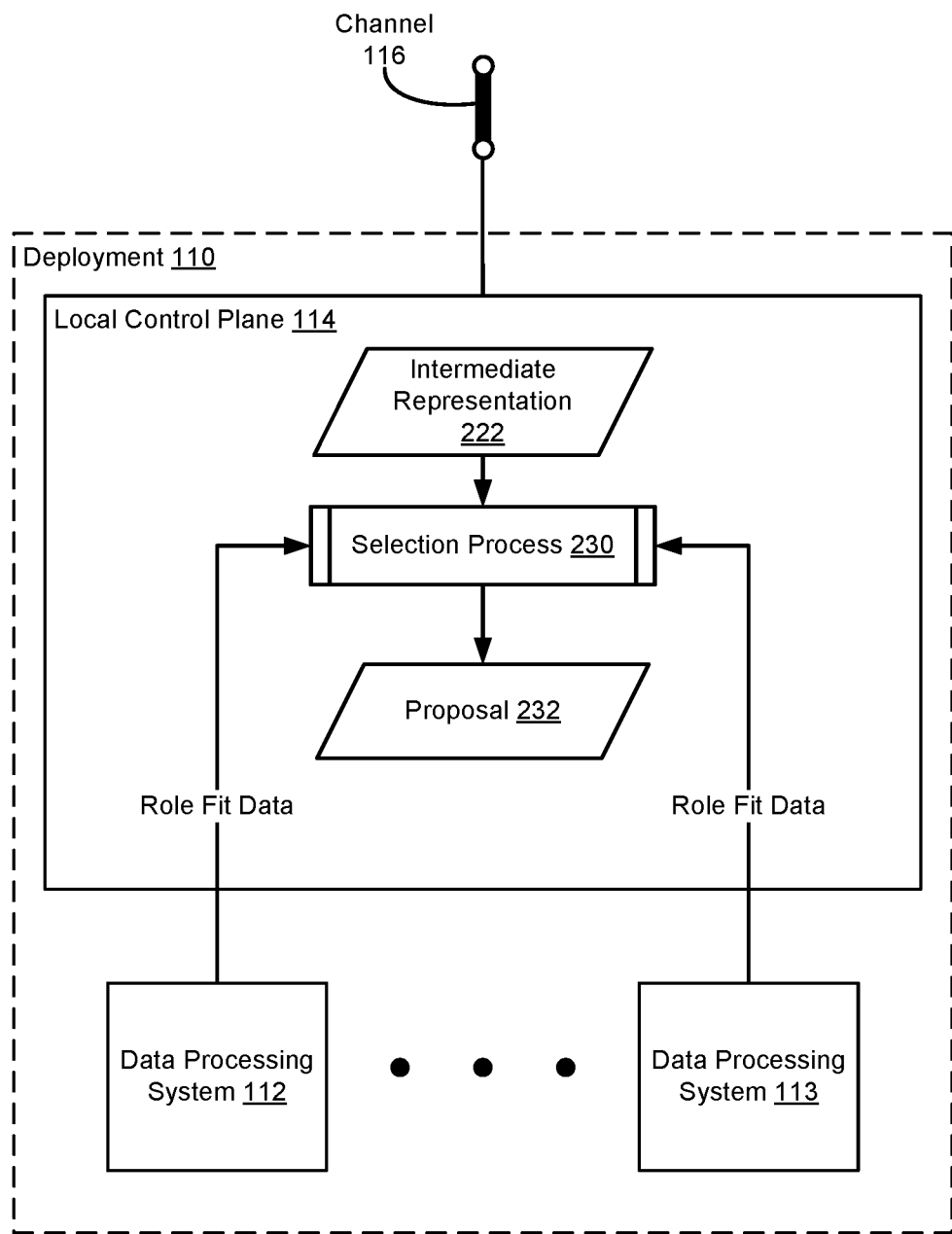

Turning to FIG. 2B, a second data flow diagram in accordance with an embodiment disclosed herein is shown. With respect to FIG. 2B, consider a scenario in which deployment 110 become isolated. In response to becoming isolated, the data processing systems of deployment 110 may perform multiple role assignment processes. During the first role assignment process, management roles may be assigned. During the second role assignment process, roles for providing services may be performed.

During both role assignment processes, each of data processing systems 112-113 may evaluate their capacities for performing the roles. To do so, data processing systems 112-113 may (i) identify hardware and/or software needed to perform the roles as well as other characteristics to meet the criteria for each role (e.g., power availability, connectivity, etc.), (ii) compare their available hardware, software, and/or other characteristics (e.g., in aggregate the "evaluation metrics") to the criteria for each role to identify their capability to perform each of the roles, (iii) rank or otherwise grade their evaluation metrics for each of the roles based on their capabilities to perform the roles, and/or (iv) provide role fit data to local control plane 114. The role fit data may indicate their self-report ability for each of the roles.

During the first phase of the role assignment process, the data processing systems may broadcast or otherwise distribute their role fit data to one another so that each data processing system may have a global view. Any type of voting process may then be implemented based on the role fit data to elect data processing systems to each of the roles.

During the second phase of the role assignment process, the data processing systems may send their role fit data to, for example, data processing systems that have taken on management roles. Thus, in FIG. 2B and the remainder, the membership in local control plane 114 may change over time depending on whether management roles have been established. For example, prior to implementation of management roles, all of the data processing systems may be members of the local control plane while after establishment of the management roles only those data processing systems performing management roles may be part of local control plane 114.

The data processing systems may rank or otherwise grade their ability for each role using the performance metrics associated with each role. The data processing systems may evaluate their performance for each of the performance metrics (e.g., through simulation, test implementation, or other processes), and compare their performance to the given performance metrics.

For example, returning to the example for data storage services, if a performance metric indicates completion of 100 storage transactions per second, a data processing system may temporarily deploy a software stack capable of performing the storage transactions and ingest a set of test storage transactions to identify a storage transactions rate per second by the data processing system. The data processing system may then compare the tested rate to the performance metric to identify whether and to what extent the data processing system is able to perform the role. For example, if the storage transaction rate of the data processing system was 120 storage transactions per second, then the data processing system may report in the role fit data that the data processing system is 120% capable of performing the role (e.g., $120/100$ transactions per second). While described with respect to a single software stack, the data processing system may evaluate its performance with respect to any number of software stacks and/or hardware configurations (e.g., also referred to as "tested configurations") when evaluating its capability for performing the role. The resulting role fit data may include a report of the highest capability (for all of the tested configurations), an average capability (of the tested configurations, all of the capabilities for all of the tested configurations, limitations with respect to any of the tested configurations (e.g., whether the data processing system has sufficient free available hardware resources to support the tested configurations), and/or other information usable to appraise local control plane 114 of the capabilities of data processing systems 112-113.

While described with respect to testing for individual ability to perform roles, each of the data processing systems may also report in the role fit data their capability to perform roles in cooperation with other data processing systems. Like their individual abilities to perform roles, the distributed capability for role performance may be evaluated through cooperative testing with other data processing systems.

The resulting role fit data may indicate, for a given role, (i) a self-ranking of the ability of the data processing system to perform the role, (ii) a self-rank of the ability of a group of the data processing systems (to which the data processing system is a member) to perform the role, and/or (iii) other information reflecting the self-evaluated ability to perform a role (e.g., such as numerical quantifications with respect to different criteria for each of the roles).

Local control plane 114 may perform selection process 230 using the role fit data to obtain proposal 232. Selection process 230 may parse the role fit data to identify which of data processing systems 112-113 is best able to perform the role. Selection process 230 may include rank ordering data processing systems for the roles based on the role fit data.

The rank ordering may be based on (i) the available hardware resources of each of the data processing systems as well as other characteristics evaluated by the criteria for each of the roles, (ii) the magnitude of change to the existing hardware configurations and/or software hosted by each of the data processing systems to perform a role, (iii) the self-reported ability of each data processing system to perform the role, and/or (iv) other factors. The rank ordering may be obtained using an objective function that takes into account the above factors and outputs a numerical value. The rank ordering may be established based on the numerical values obtained from the objective function for each of the data processing systems.

For example, in the context of a management role, consider a scenario where an objective function is used that evaluates (i) a level of existing workload and (ii) a level of backup power available to a data processing system. The objective function may, for example, heavily weight the level of backup power available when compared to the weighting of the level of existing workload. Consequently, a data processing system having a large reserve of backup power may be preferentially selected over a second data processing system without battery backup even if the data processing system is already heavily loaded with existing workloads. The objective function may be used to weight and evaluate any number of criteria to obtain numerical quantifications usable to rank order data processing systems for various roles.

Proposal 232 may indicate which of data processing systems 112-113 are initially proposed (e.g., provisionally) to perform each of the roles (and/or groups of data processing systems to cooperatively perform roles, for roles that may be distributed across data processing systems). When deployment 110 is isolated, proposal 232 may be treated as a temporary proposal that may need to be subsequently ratified by other elements of the control plane once connectivity is restored.

Figure 2C:
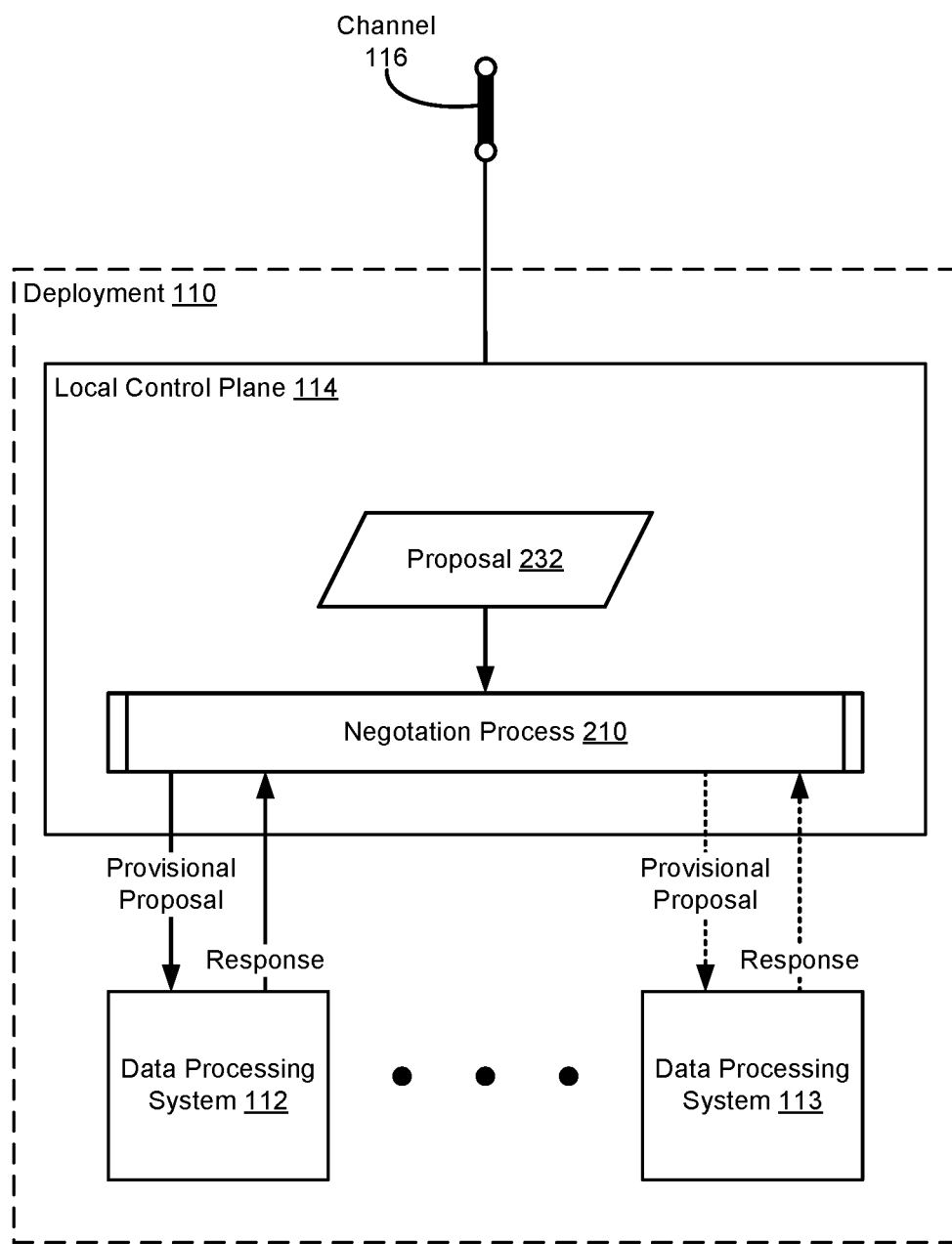

Turning to FIG. 2C, a third data flow diagram in accordance with an embodiment is shown. Using proposal 232, local control plane 114 may perform negotiation process 210 to ascertain which of data processing systems 112-113 will perform the roles.

Negotiation process 210 may be performed to confirm role assignments based on proposal 232. If proposal 232 is a temporary proposal, negotiation process 210 may use governance roles included in the intermediate representation. The governance rules may increase the level of agreement required for data processing systems to be assigned rules. For example, while deployment 110 is not isolated, a default set of governance rules may be used that may only require assent of a data processing system that will perform a role for the role to be assigned. However, when isolated, the governance rules may increase the level of assent required for a role to be assigned. Under strict governance rules, unanimous consent of all of the data processing systems may be required for a role to be assigned to a data processing system. Depending on the number of data processing systems, different levels of consent (e.g., ratio of assenting vs dissenting) may be required for roles to be assigned.

Each of data processing systems 112-113 may, upon receipt of information regarding proposal 232, evaluate and either agree or disagree with each proposed role assignment. The data processing systems may do so, for example, using information available to them that may not otherwise be available to other data processing systems.

For example, negotiation process 210 may include, for one of the roles, sending a provisional proposal to the highest rank ordered data processing systems (e.g., 112). The provisional proposal may indicate that data processing system 112 is being requested to take on the role.

The data processing system may then accept or reject the provisional proposal. To decide whether to accept or reject the proposal, the data processing system may evaluate whether it is likely to be able to successfully perform the role. The data processing system may do so by evaluating an impact on its current roles (which it is already performing) for performing the proposed role. For example, the data processing system may evaluate the computing resources necessary to perform the role based on the hardware and/or software used to estimate its capability to perform the role, discussed above, and compare the computing resources to the available computing resources. If the required computing resources exceed the available computing resources, then the data processing system may elect to reject the role. In contrast, if the required computing resources are within the available computing resources, then the data processing system may elect to take on the role.

For roles proposed to be assigned to other data processing systems, the data processing systems may evaluate the assignment based on their interactions with other data processing systems. For example, if a data processing system depends on functionality of another data processing system, the data processing system may evaluate whether the other data processing system is providing the functionality in accordance with criteria corresponding to the role performed by the other data processing system. If the performance of the function by the other data processing system does not meet the criteria, then the data processing system may cast a vote against the assignment.

Once the decision is made by a data processing system, a response may be provided to local control plane 114. If rejected based on the responses received from the data processing systems, then negotiation process 210 may continue and a new provisional proposal may be made to the next highest ranked data processing system (e.g., 113, lines to and from data processing system 113 drawn in dashed lines to indicate that the provisional and response to data processing system 113 may or may not occur, depending on whether data processing system 112 accepted, in this example).

In the event that no data processing system accepts the provisional proposals, then a remediation process may be performed for the role. The remediation process may include decreasing the performance metrics for the role, opening the role to distributed performance by multiple data processing system, etc. Additional provisional proposals may then be initiated until one or more data processing systems agree to the role and/or the data processing systems vote to accept the role assignment.

Figure 2D:
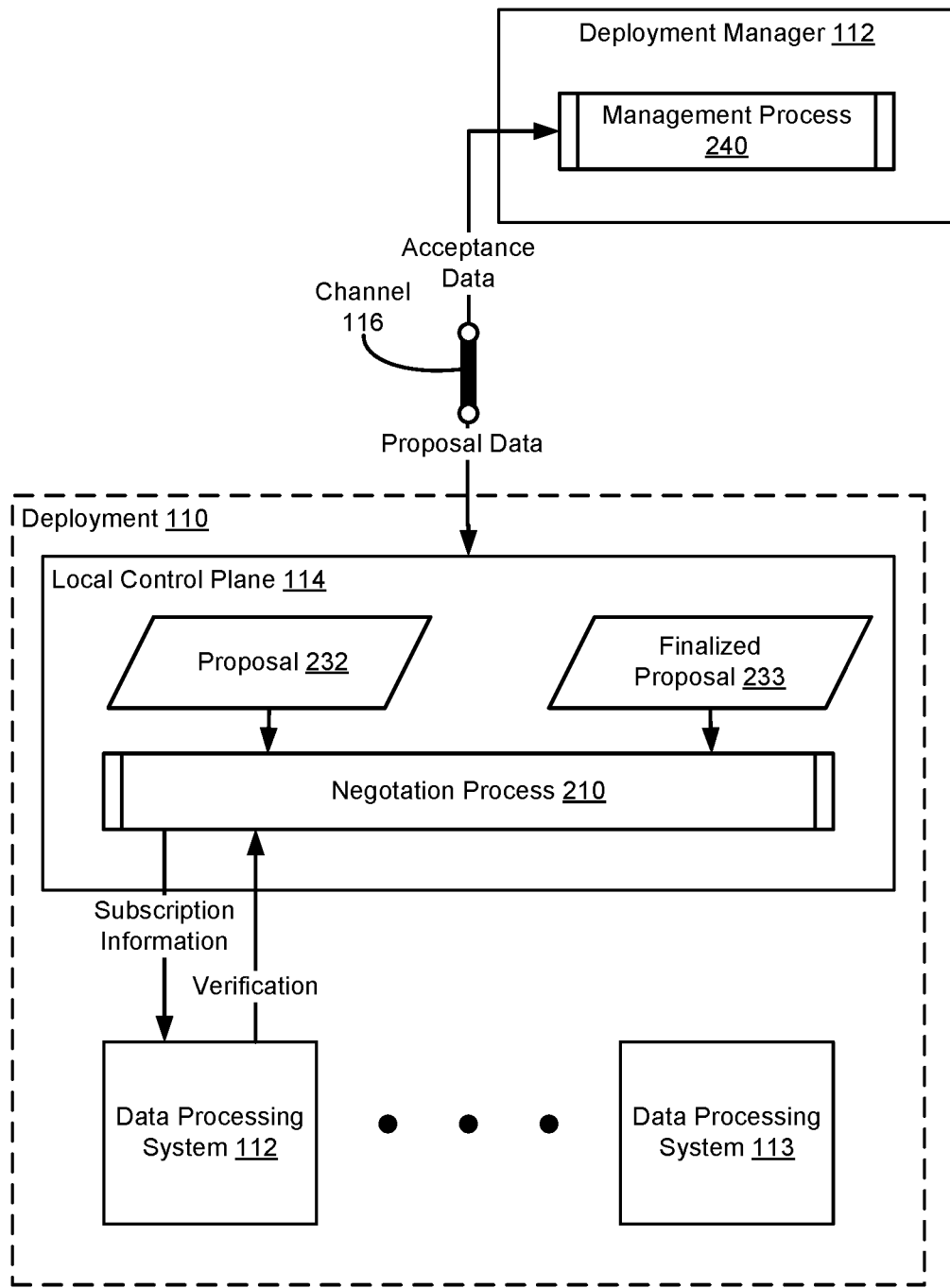

Turning to FIG. 2D, a fourth data flow diagram in accordance with an embodiment is shown. When a role assignment is made, subscription information may be transmitted to the data processing system (illustrated in FIG. 2D with respect to data processing system 112, but could be any of the data processing systems) that will implement the role. The subscription information may include information regarding when and under what conditions that the data processing system is to suspend or stop performing the role, which entities for which the role is to be performed (e.g., which client devices may utilize the services provided through the role), and/or other information usable to perform the role.

Likewise, in the context of a management role, the subscription information may include performance limits that, if not met, indicate that the data processing system is to relinquish the role (e.g., which may trigger a new negotiation process). The performance limits may include criteria like any of that discussed with respect to assignment of management roles.

Once the subscription information is received, the data processing system may take action to perform the role. The actions may include, for example, any of (i) reconfiguring hardware components, (ii) deploying new software components, (iii) reconfiguring existing software components, (vi) performing verification actions, and/or (v) providing a verification to local control plane 114. The verification may indicate that the role is not yet being performed, and also includes information usable to ascertain whether the role is being performed within the performance metrics for the role. For example, the verification actions may include performing testing to ascertain the data processing system's performance levels with respect to the performance metrics for the role.

Figure 2E:
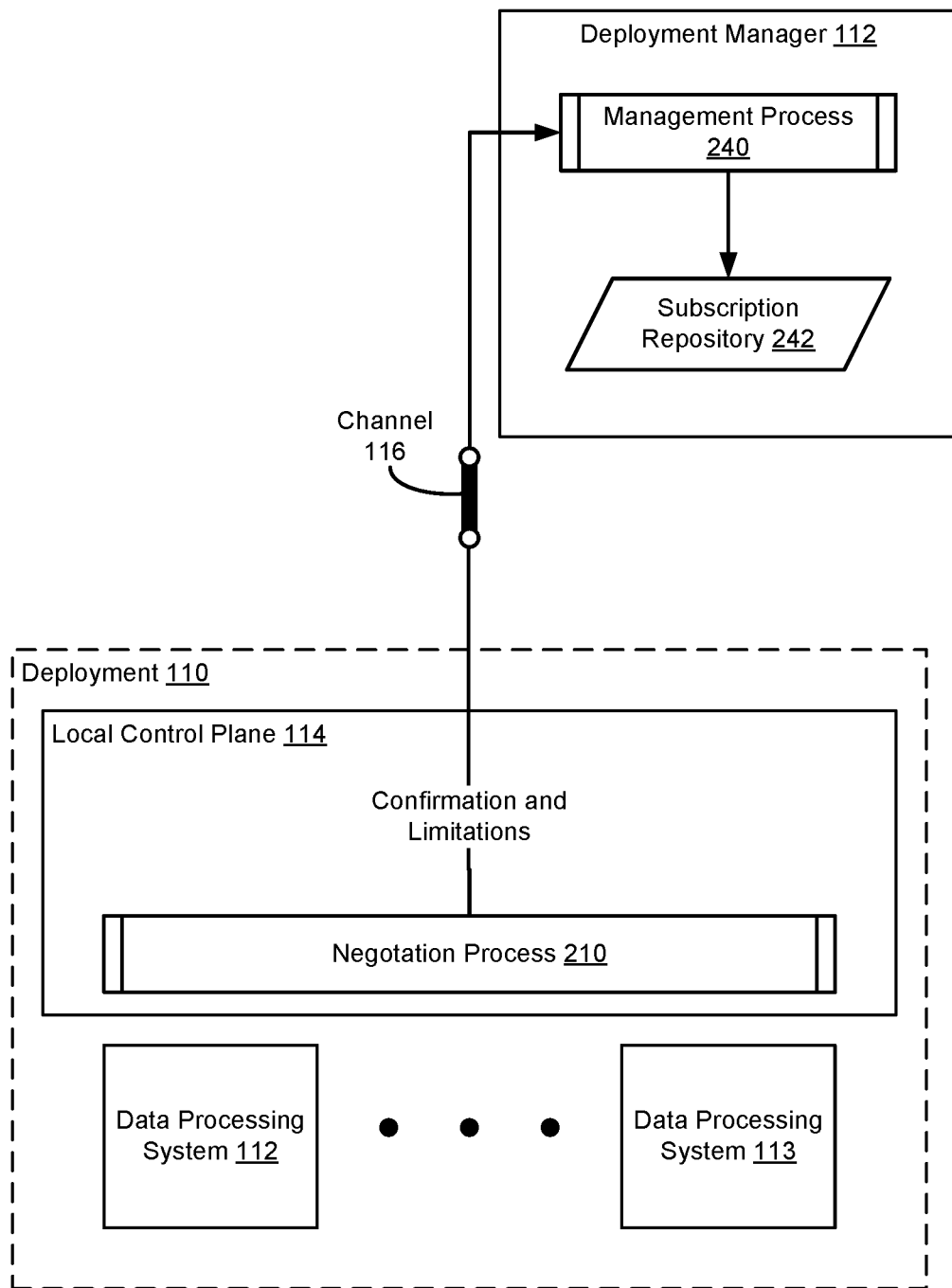

Turning to FIG. 2E, a fifth data flow diagram in accordance with an embodiment is shown. Once communication with other portions of the control plane is restored, the temporary proposal and implementation may be validated, verified, and/or modified (if validation fails or efficiency gains may be obtained through role reassignment).

Based on a verification from a data processing system, negotiation process 210 may provide a confirmation regarding the role as well as any limitations for the role to deployment manager 106. For example, deployment manager 106 may perform a management process 240 that manages the functionalities requested by users of the clients. Management process 240 may process the confirmation and limitations to quantify whether a functionality is being provided in a manner consistent with a requestor of the functionality.

For example, management process 240 may maintain subscription repository 242. Subscription repository 242 may include information regarding the functionalities requested (e.g., subscribed to) by users of the clients. For a given functionality, management process 240 may track the confirmations and limitations from deployment 110. Management process 240 may compare, based on the confirmations and limitations, the extent to which a particular functionality is being provided to a user. Once the functionality meets metrics (e.g., when all of the roles of an intermediate representation corresponding to the function), then subscription repository 242 may be updated to reflect that a subscription for the functionality is now being satisfied.

Similarly, the roles assigned while deployment 110 is isolated may be re-evaluated to ascertain whether some degree of efficiency may be obtained through role reassignment. An intermediate representation may include different sets of roles to be implemented under different operating conditions. For example, while isolated one set of roles may be implemented. These roles may generally include evaluation criteria that is more conservative thereby improving the likelihood of a data processing system that meets the criteria also successfully performing the role. In contrast, while not isolated another set of roles may be implemented. The roles from the other set may generally include evaluation criteria that is more aggressive thereby potentially increasing computing resource use efficiency while incurrent more risk with respect the to-be-provided services. However, because the full control plane may have a view into the operation of deployment 110, the increased level of risk may be acceptable (e.g., the full control plane may be able to take additional remedial action that deployment 110 may not be able to take to address any shortcomings in the provided services).

Once a subscription is satisfied, then the use and performance of the functionality may be tracked to (i) confirm that the subscription for the functionality continues to be satisfied and (ii) identify whether any limits on the subscription (e.g., number of concurrent users, number of uses, duration of subscription, etc.) are exceeded. If any of the limits are exceeded, then management process 240 may confirm whether the data processing systems performing the roles for the subscription for the functionality have discontinued performing or otherwise modified their performance to limit the use of the subscription to be within the subscription limitations. Management process 240 may take action to modify the operation of the data processing systems if the data processing systems are exceeding the subscribed to level of the functionalities.

Figure 2F:
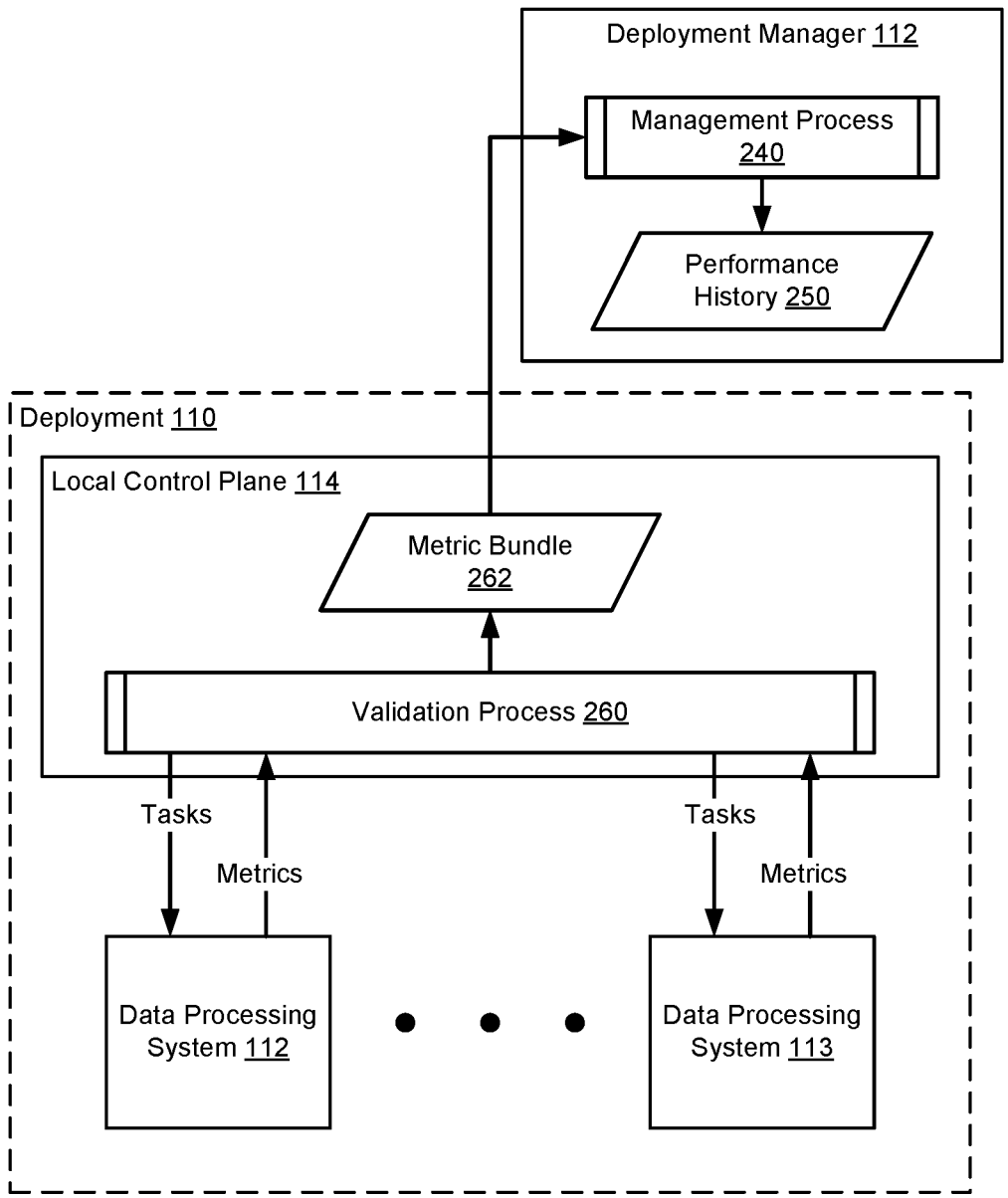

Turning to FIG. 2F, a sixth data flow diagram in accordance with an embodiment is shown. To identify whether any subscription limits have been exceeded, local control plane 114 may implement validation process 260. Validation process 260 may assign data collection tasks to data processing systems 112-113. The tasks may include monitoring performance of the roles assigned to data processing systems 112-113 to ascertain whether any of the subscription limitations have been exceeded. For example, the tasks may include monitoring of the computing resources consumed for performing the roles, the number of clients serviced by the roles, and/or other data collection processes to obtain metrics usable to ascertain whether subscription limitations have been exceeded.

The metrics may be collected by local control plane 114, aggregated, and provided to deployment manager 106 as metric bundle 262. Management process 240 may use metric bundle 262 to establish performance history 250. Performance history 250 may quantify the extent of use of the data processing systems for providing a functionality, the extent of use of the functionality by other devices, and/or otherwise establish a basis for ascertaining whether subscription limits have been exceeded and performance goals for a functionality are met.

Any of the processes described with respect to FIGS. 2A-2F may be implemented using any combination of software components (e.g., processes executing using computer processors) and/or non-programmable hardware components that include circuitry adapted to provide all, or a portion, of the functionality of the processes.

Figure 3A:
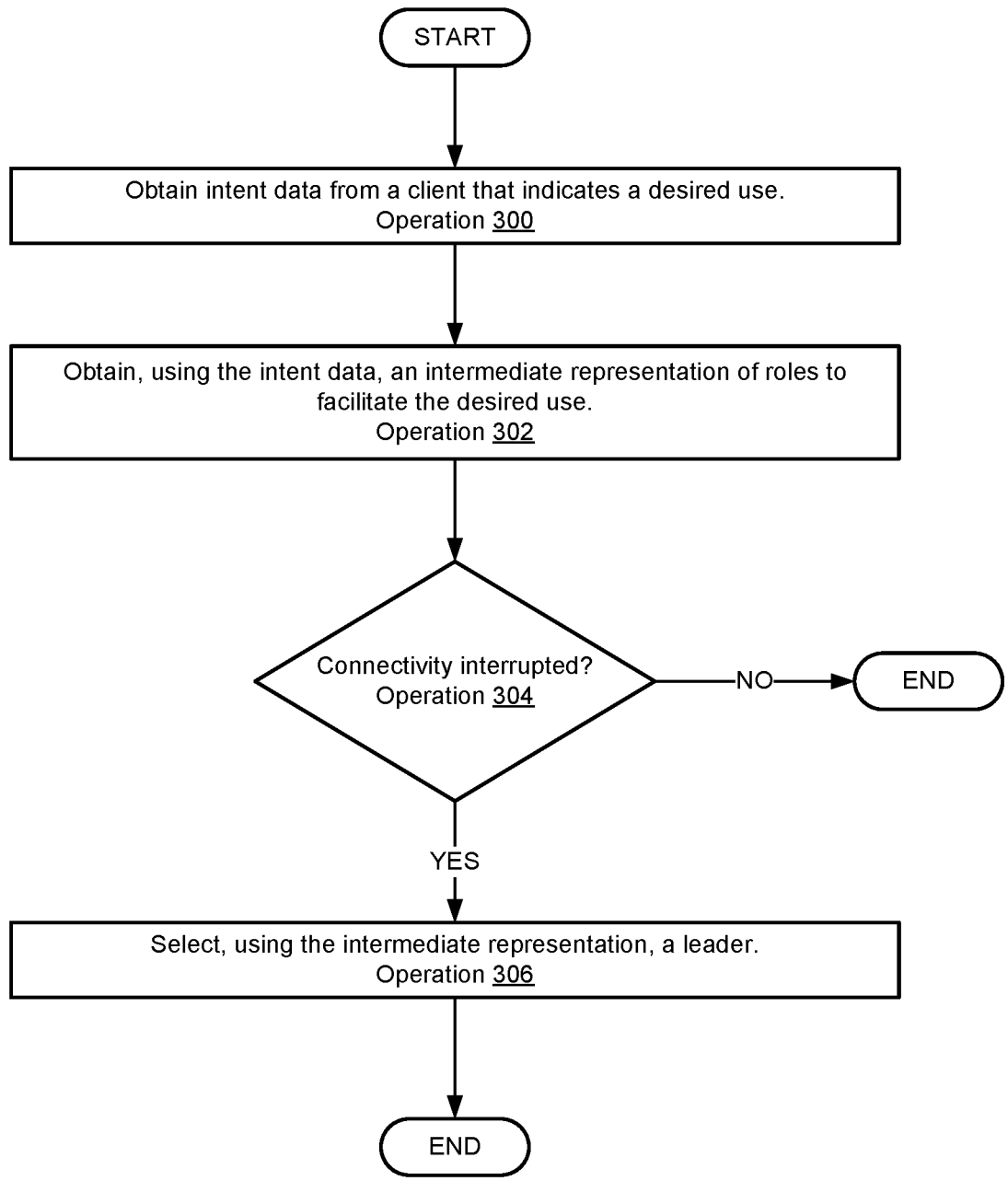
FIGS. 3A-3B show flow diagrams illustrating methods of providing computer implemented services in accordance with an embodiment.
Figure 3B:
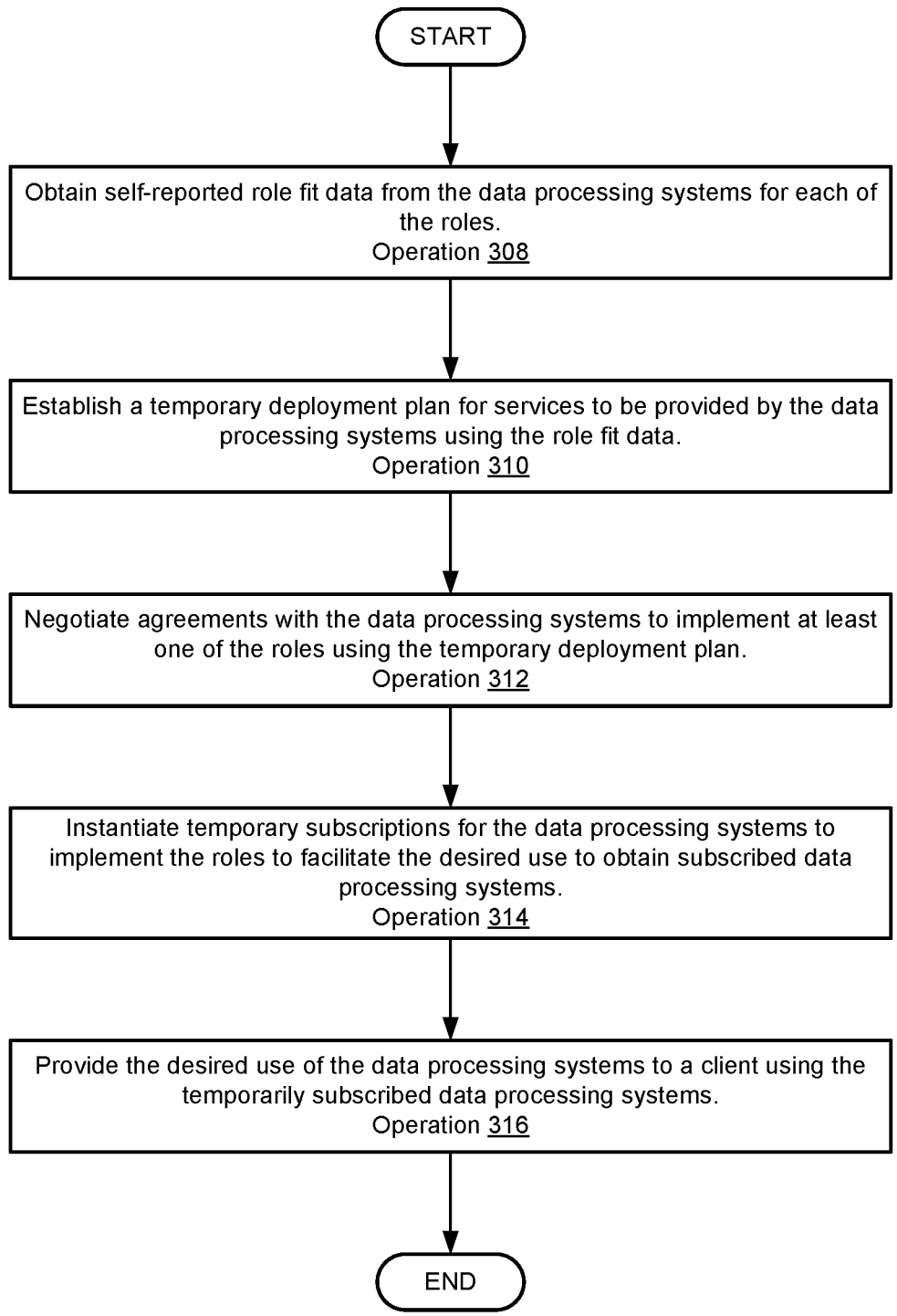

As discussed above, the components of FIG. 1 may perform various methods to manage a deployment. FIGS. 3A-3B illustrate examples of methods that may be performed by the components of FIG. 1. In the diagram discussed below and shown in FIGS. 3A-3B, any of the operations may be repeated, performed in different orders, and/or performed in parallel with or a partially overlapping in time manner with other operations.

Turning to FIG. 3A, a flow diagram illustrating a method of providing computer implemented service in accordance with an embodiment is shown. The method may be performed by a data processing system, a deployment manager, a client, and/or another component (e.g., not shown in FIG. 1).

At operation 300, intent data from a client that indicates a desired use is obtained. The desired use may be to receive a functionality of a deployment. The functionality may be provided through computer implemented services used by the client and provided by the deployment.

The intent data may be obtained from the client by (i) displaying a graphical user interface to the client that shows the available functionalities of the deployment, and (ii) receiving, via the graphical user interface, one or more user inputs indicating the intent from the client. The user inputs may be obtained, for example, by the user clicking on active elements (e.g., widgets, input boxes, etc.) of the graphical user interface. The input may indicate the functionalities to be provided, capacities and/or other characterizations regarding an extent of desired use of the functionalities, duration based and/or other types of limitations regarding the desired use, and/or other information indicating an intent of a user of the client. While described with respect to a graphical user interface, the intent of the client may be obtained via other methods without departing from embodiments disclosed herein.

At operation 302, an intermediate representation of roles to facilitate the desired use is obtained using the intent data. The intermediate representation may be obtained by (i) translating the intent data into a portion of roles for the intermediate representation, (ii) establishing one or more management roles for the intermediate representation, and/or (iii) adding information regarding governance rules to the intermediate representation.

For example, to establish the portion for the roes based on the intent data, the intent data may serve as one or more keys usable to perform a lookup in a data structure that associates the keys with roles and/or role identifiers. The intermediate representation may be obtained using the roles and/or role identifiers. For example, information regarding the roles and/or the role identifiers may be aggregated into a data structure (e.g., the intermediate representation). The lookup may return different sets of roles to be implemented when a deployment is isolated and when a deployment is not isolated. The resulting portion of roles may include these different sets of roles.

Similarly, the portion of the roles may serve as one or more keys usable to perform a lookup in a data structure that associates the portion of the roles with one or more management roles and/or management identifiers. The intermediate representation may be obtained using the management roles and/or management role identifiers. For example, information regarding the management roles and/or the management role identifiers may be aggregated into the data structure (e.g., the intermediate representation).

The governance rules may, like the management roles, may be identified by performing a lookup in a data structure that associates the management roles with various sets of governance rules to be used under different operating conditions (e.g., based on the numbers and capabilities of data processing systems). Information regarding the governance rules identified via the lookup may be aggregated into a data structure (e.g., the intermediate representation).

While described with a respect to a lookup, the process for identifying the roles, management roles, and governance rules may be other types of identification procedures (e.g., other than lookups) without departing from embodiments disclosed herein.

At operation 304, a determination is made regarding whether connectivity has been interrupted. The connectivity may facilitate operable communication between a deployment and other portions of a distributed control plane. The determination may be made by monitoring the connectivity (e.g., by data processing systems of the deployment) through any process (e.g., such as identifying that attempts at communication have been unsuccessful).

If it is determined that the connectivity has been interrupted, the method may proceed to operation 306. Otherwise, the method may end following operation 304.

If the method ends, other processes for managing a deployment may be implemented. For example, these other processes may include using a set of roles to be implemented while connectivity is maintained in the intermediate representation to effectuate the intent of a user. This set of roles may be implemented through collaboration between portions of the control plane local to the deployment and other portions of the control plane that are remote to the deployment. In contrast, as will be discussed below, while connectivity is interrupted other roles, management roles, governance rules, and/or other information from the intermediate representation may be used to effectuate the intent of the user.

At operation 306, a leader is selected using the intermediate representation. The leader may be selected by: (i) distributing information regarding criteria to be the leader to data processing systems of a deployment, (ii) obtaining self-reported roll fit data for the leader based on the criteria, (iii) ranking the data processing systems based on the self-reported roll fit data, and (iv) selecting the leader based on the ranking. Other management roles may be assigned using similar processes. During assignment of the management roles, governance rules from the intermediate representation may be enforced.

The method may end following operation 306.

Using the method illustrated in FIG. 3A, a local control plane may be configured in an isolated deployment that may facilitate continued provisioning of services. The local control plane may make, while the deployment is isolated, temporary assignments of roles (e.g., both initially and in response to device failures and/or other conditions that may warrant reassignment of roles to different data processing systems). The temporarily assigned roles may facilitate used of services by a user until connectivity between the deployment and other portions of a control plane is restored.

Turning to FIG. 3B, a flow diagram illustrating a method of providing computer implemented service in accordance with an embodiment is shown. The method may be performed by a data processing system, a deployment manager, a client, and/or another component (e.g., not shown in FIG. 1). The flow diagram shown in FIG. 3B may be a continuation of the flow diagram of FIG. 3A.

At operation 308, self-reported role fit data is obtained from each of the data processing systems for each of the roles. The self-reported role fit data may (i) indicate estimates of the ability of each data processing system to fulfill each of the roles and/or (ii) include other information reflecting how adoption of the role may be implemented by a data processing system. The self-reported role fit data may be obtained by receiving it or otherwise obtaining it from the data processing systems. The local control plane (e.g., a leader) may aggregate the information.

For example, information regarding the roles may be provided to the data processing systems (e.g., such as a listing of the roles), the data processing systems may self-evaluate their abilities to perform the roles to the leader and/or other members of the local control plane, and the data processing systems may self-report their role fit data based on their self-evaluation of the abilities to perform the roles.

The self-reported role fit data may only include information for a subset of the roles indicated by the intermediate representation. For example, while isolated the data processing systems of the deployment may only report role-fit data for roles to be implemented while the deployment is isolated.

At operation 310, a temporary deployment plan for services to be provided by the data processing systems is established based on the self-reported role fit data. The temporary deployment plan may be obtained by rank-ordering the data processing systems based on their self-reported role fit data for each role. The rank ordering may be obtained by (i) rank ordering based on the estimated abilities to perform each of the roles to obtain an initial rank ordering and (ii) selection of data processing systems for the roles based on the rank ordering. For example, the highest ranked data processing system for each role may be selected to provide the services associated with each of the roles.

At operation 312, agreements with the data processing systems to implement at least one of the roles is negotiated using the temporary deployment plan. The agreements may be negotiated by, for a role, generating and sending a provisional proposal to the best ranked data processing system, and receiving a response based on the provisional proposal. Depending on the governance rules in place, the provisional proposal may also be sent out to other data processing systems which may similarly respond regarding assignment of the role to the data processing system If the responses are affirmative to a degree required by the governance rules, then an agreement may be reached and the data processing system may be selected for the role. If the response is negative, then a similar process may be performed with respect to the next highest ranked data processing system. This process may continue until a data processing system respond is selected for the role, or no data processing system is selected.

If no data processing system is selected, then the quality metrics for the role may be adjusted (e.g., by reducing them), and/or the process may be repeated with the adjusted metrics. The quality metrics may be lowered via the adjustment thereby allowing a data processing system that does not meet the quality metrics to agree to take on the role and a level of agreement of the other data processing system obtained that meets the standards set forth in the governance rules.

If no data processing system is selected, then the aforementioned process may be repeated, but for distributed implementations of the role where multiple data processing systems may provide the roles.

At operation 314, temporary subscriptions for the data processing systems are instantiated to implement the roles to facilitate the desired use to obtain subscribed data processing systems. The subscriptions may be instantiated by, for example, (i) verifying that the data processing systems that have agreed to the roles have implemented any software and/or hardware changes to take on the role (e.g., using the software and/or hardware configurations through which the self-evaluations with respect to the ability each of each data processing system to perform the roles), (ii) validating the extent to which the data processing systems actually perform the services associated with each of the roles, (iii) when satisfactorily evaluated, deploying subscription information to the data processing systems, the subscription information may provide criteria through which the data processing systems evaluate whether subscription limitations have been exceeded, and/or (iv) recording the subscriptions as being serviced in management systems.

At operation 316, the desired use of the data processing systems is provided to the client using the temporarily subscribed data processing systems. The desired use may be provided through the operation of the temporarily subscribed data processing systems.

The method may end following operation 316.

Following operation 316, connectivity may be restored to other portions of the control plane. As discussed above, once restored, the local control plane of the deployment may provide information regarding the temporary subscriptions and role assignments to the other portions of the control plane. The other portions of the control plane may then ratify the subscriptions and role assignments, or initiate a reassignment and resubscription process.

Using the methods illustrated in FIGS. 3A-3B, embodiments disclosed herein may provide a distributed system that is better able to provide desired services at a lower computational overhead when compared to systems that use rigid central management modalities and/or fixed configurations for systems to provide services. Additionally, to provide for flexibility in implementation, data processing systems isolated from portion of a control plane may establish and use a local control plane. The local control plane may configure and use the data processing systems to implement roles to effectuate a user's intent even while disconnected from the rest of the control plane. Thus, embodiments disclosed herein may address, among others, the technical challenge of using data processing systems to provide services in distributed systems where top-down management may result in great inefficiencies of use of data processing systems (e.g., data processing systems that do not meet rigid configurations for providing services may be ignored) and intermittent connectivity within the distributed environment.

Figure 4:
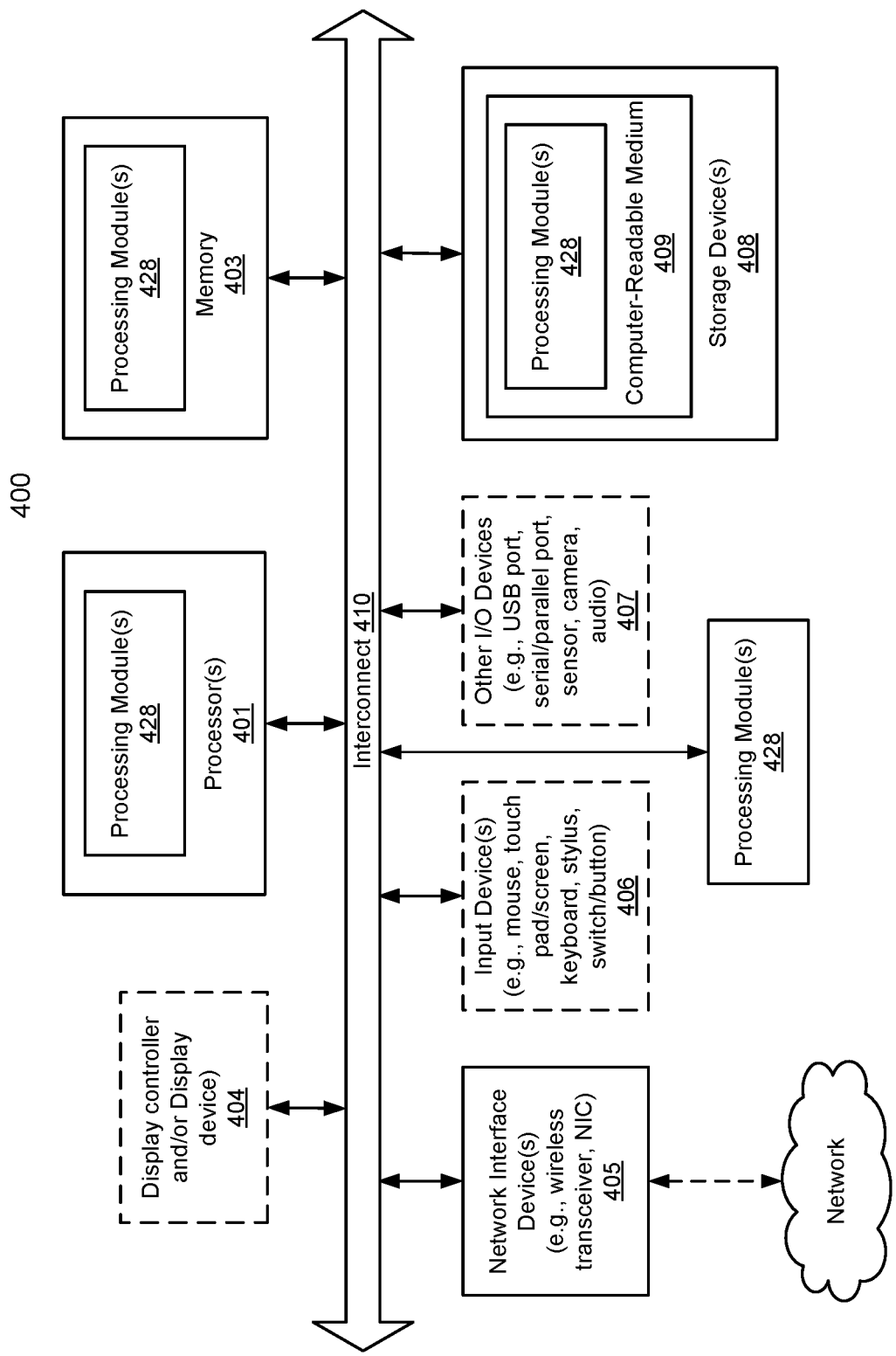
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing services provided using data processing systems, the method comprising:
    obtaining, by a local control plane of a deployment, an intermediate representation of roles to facilitate a desired use of the data processing systems;
    making, by the local control plane, a determination that the local control plane is communicatively disconnected from other control plane elements;
    based on the determination:
        selecting, by the local control plane and using the intermediate representation, a data processing system of the data processing systems as a leader;
        obtaining, by the leader, self-reported role fit data from the data processing systems for each of the roles, the role fit data indicating estimates of an ability of each of the data processing systems to fulfill each of the roles;
        establishing, by the leader and based on the role fit data, a temporary deployment plan for services to be provided by each of the data processing systems, the temporary deployment plan indicating assignment for the data processing systems to perform the roles;
        instantiating, based on the temporary deployment plan, temporary subscriptions for the data processing systems to implement the roles to facilitate the desired use to obtain subscribed data processing systems; and
        providing the desired use of the data processing systems to a client using the subscribed data processing systems.

2. The computer-implemented method of claim 1, further comprising:
    negotiating, by the leader and using the temporary deployment plan, agreements with the data processing systems to implement at least one of the roles,
    wherein the subscriptions are also instantiated based on the agreements.

3. The computer-implemented method of claim 2, wherein negotiating the agreements comprises:
    for a role of the roles:
        selecting a data processing system of the data processing systems to perform the role;
        distributing proposals to all of the data processing systems indicating the selected data processing system for the role;
        obtaining responses from all of the data processing systems based on the distributed proposals;
        in a first instance of the responses that indicate unanimous assent, recording the data processing system as performing the role in the temporary deployment plan; and
        in a second instance of the responses that does not indicate unanimous assent, selecting a different data processing system of the data processing systems to perform the role.

4. The computer-implemented method of claim 1, further comprising:
    after providing the desired use of the data processing systems to the client using the subscribed data processing systems:
        making, by the local control plane, a second determination that the local control plane is communicatively connected to other control plane elements;
        performing, by the leader, a validation of the temporary deployment plan with the other control plane elements;
        in a first instance of the validation where the temporary deployment plan is accepted by the other control plane elements:
            finalizing the temporary deployment plan; and
        in a second instance of the validation where the temporary deployment plan is not accepted by the other control plane elements:
            establishing a replacement deployment plan for the temporary deployment plan.

5. The computer-implemented method of claim 4, wherein finalizing the temporary deployment plan comprises:
    initiating performance of tasks by the data processing systems assigned to perform the roles in the temporary deployment plan;
    evaluating the performance of the tasks to obtain metrics;
    comparing the metrics to standards associated with the roles to identify a level of compliance for each of the roles; and
    establishing a performance history for the desired use using the level of compliance for each of the roles.

6. The computer-implemented method of claim 5, wherein providing the desired use of the data processing systems to the client using the subscribed data processing systems comprises:
    based on the performance history, identifying a duration of time for which the use of the data processing systems is provided to the client.

7. The computer-implemented method of claim 6, wherein the duration of time comprises a first time period while the local control plane is communicatively disconnected from the other control plane elements and a second time period while the local control plane is communicatively connected to the other control plane elements.

8. A non-transitory machine-readable medium having instructions stored therein, which when executed by a processor, cause the processor to perform operations for managing services provided using data processing systems, the operations comprising:
  obtaining, by a local control plane of a deployment, an intermediate representation of roles to facilitate a desired use of the data processing systems;
  making, by the local control plane, a determination that the local control plane is communicatively disconnected from other control plane elements;
  based on the determination:
    selecting, by the local control plane and using the intermediate representation, a data processing system of the data processing systems as a leader;
    obtaining, by the leader, self-reported role fit data from the data processing systems for each of the roles, the role fit data indicating estimates of an ability of each of the data processing systems to fulfill each of the roles;
    establishing, by the leader and based on the role fit data, a temporary deployment plan for services to be provided by each of the data processing systems, the temporary deployment plan indicating assignments for the data processing systems to perform the roles;
    instantiating, based on the temporary deployment plan, temporary subscriptions for the data processing systems to implement the roles to facilitate the desired use to obtain subscribed data processing systems; and
    providing the desired use of the data processing systems to a client using the subscribed data processing systems.

9. The non-transitory machine-readable medium of claim 8, wherein the operations further comprise:
  negotiating, by the leader and using the temporary deployment plan, agreements with the data processing systems to implement at least one of the roles,
  wherein the subscriptions are also instantiated based on the agreements.

10. The non-transitory machine-readable medium of claim 9, wherein negotiating the agreements comprises:
  for a role of the roles:
    selecting a data processing system of the data processing systems to perform the role;
    distributing proposals to all of the data processing systems indicating the selected data processing system for the role;
    obtaining responses from all of the data processing systems based on the distributed proposals;
    in a first instance of the responses that indicate unanimous assent, recording the data processing system as performing the role in the temporary deployment plan; and
    in a second instance of the responses that does not indicate unanimous assent, selecting a different data processing system of the data processing systems to perform the role.

11. The non-transitory machine-readable medium of claim 8, wherein the operations further comprise:
  after providing the desired use of the data processing systems to the client using the subscribed data processing systems:
    making, by the local control plane, a second determination that the local control plane is communicatively connected to other control plane elements;
    performing, by the leader, a validation of the temporary deployment plan with the other control plane elements;
    in a first instance of the validation where the temporary deployment plan is accepted by the other control plane elements:
      finalizing the temporary deployment plan; and
    in a second instance of the validation where the temporary deployment plan is not accepted by the other control plane elements:
      establishing a replacement deployment plan for the temporary deployment plan.

12. The non-transitory machine-readable medium of claim 11, wherein finalizing the temporary deployment plan comprises:
  initiating performance of tasks by the data processing systems assigned to perform the roles in the temporary deployment plan;
  evaluating the performance of the tasks to obtain metrics;
  comparing the metrics to standards associated with the roles to identify a level of compliance for each of the roles; and
  establishing a performance history for the desired use using the level of compliance for each of the roles.

13. The non-transitory machine-readable medium of claim 12, wherein providing the desired use of the data processing systems to the client using the subscribed data processing systems comprises:
  based on the performance history, identifying a duration of time for which the use of the data processing systems is provided to the client.

14. The non-transitory machine-readable medium of claim 13, wherein the duration of time comprises a first time period while the local control plane is communicatively disconnected from the other control plane elements and a second time period while the local control plane is communicatively connected to the other control plane elements.

15. A data processing system, comprising:
  a processor; and
  a memory coupled to the processor to store instructions, which when executed by the processor, cause the processor to perform operations for managing services provided using data processing systems comprising the data processing system, the operations comprising:
    obtaining an intermediate representation of roles to facilitate a desired use of the data processing systems;
    making a determination that the data processing system is communicatively disconnected from other control plane elements, the data processing system being a member of a local control plane intermittently connected to the other control plane elements;
    based on the determination:
      participating, using the intermediate representation, in a selection process for a leader, the data processing system being selected as the leader through the selection process;
      obtaining, by the leader, self-reported role fit data from the data processing systems for each of the roles, the role fit data indicating estimates of an ability of each of the data processing systems to fulfill each of the roles;

establishing, by the leader and based on the role fit data, a temporary deployment plan for services to be provided by each of the data processing systems, the temporary deployment plan indicating assignments for the data processing systems to perform the roles;

instantiating, based on the temporary deployment plan, temporary subscriptions for the data processing systems to implement the roles to facilitate the desired use to obtain subscribed data processing systems; and providing the desired use of the data processing systems to a client using the subscribed data processing systems.

16. The data processing system of claim 15, wherein the operations further comprise:

negotiating, by the leader and using the temporary deployment plan, agreements with the data processing systems to implement at least one of the roles, wherein the subscriptions are also instantiated based on the agreements.

17. The data processing system of claim 16, wherein negotiating the agreements comprises:

for a role of the roles:

selecting a data processing system of the data processing systems to perform the role;

distributing proposals to all of the data processing systems indicating the selected data processing system for the role;

obtaining responses from all of the data processing systems based on the distributed proposals;

in a first instance of the responses that indicate unanimous assent, recording the data processing system as performing the role in the temporary deployment plan; and in a second instance of the responses that does not indicate unanimous assent, selecting a different data processing system of the data processing systems to perform the role.

18. The data processing system of claim 15, wherein the operations further comprise:

after providing the desired use of the data processing systems to the client using the subscribed data processing systems:

making, by the local control plane, a second determination that the local control plane is communicatively connected to other control plane elements;

performing, by the leader, a validation of the temporary deployment plan with the other control plane elements;

in a first instance of the validation where the temporary deployment plan is accepted by the other control plane elements:

finalizing the temporary deployment plan; and in a second instance of the validation where the temporary deployment plan is not accepted by the other control plane elements:

establishing a replacement deployment plan for the temporary deployment plan.

19. The data processing system of claim 18, wherein finalizing the temporary deployment plan comprises:

initiating performance of tasks by the data processing systems assigned to perform the roles in the temporary deployment plan;

evaluating the performance of the tasks to obtain metrics;

comparing the metrics to standards associated with the roles to identify a level of compliance for each of the roles; and establishing a performance history for the desired use using the level of compliance for each of the roles.

20. The data processing system of claim 19, wherein providing the desired use of the data processing systems to the client using the subscribed data processing systems comprises:

based on the performance history, identifying a duration of time for which the use of the data processing systems is provided to the client.

* * * * *